(No Model.)
J. S. HENDRICKSON.
HARNESS.
No. 388,040. Patented Aug. 21, 1888.
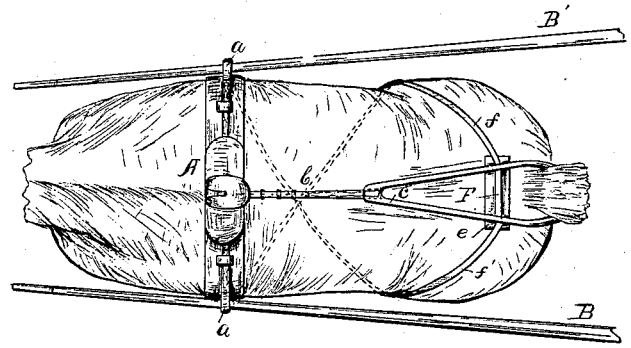
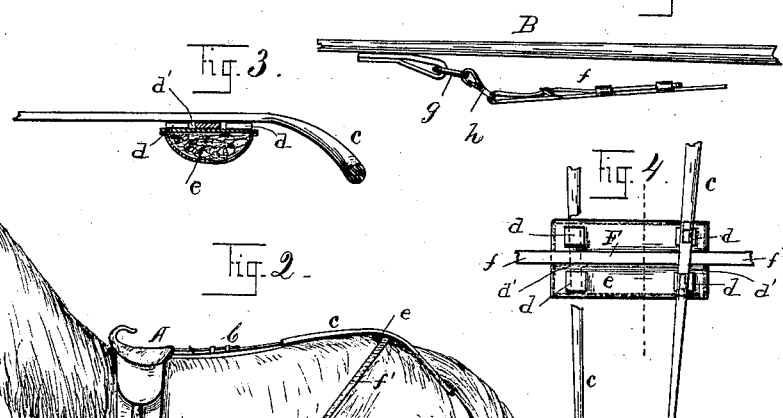
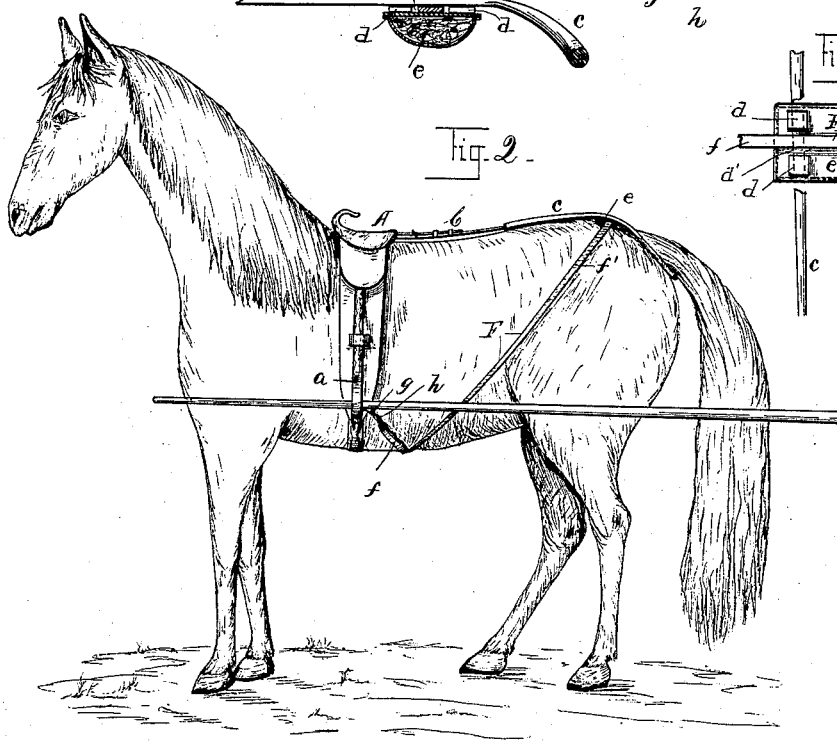
Witnesses,
C. B. Nash.
E. J. Climo.
Inventor,
J. S. Hendrickson.
By his Attorney
Thos. B. Hall

UNITED STATES PATENT OFFICE.

JAMES S. HENDRICKSON, OF OLMSTED, OHIO.

HARNESS.

SPECIFICATION forming part of Letters Patent No. 388,040, dated August 21, 1888.

Application filed November 21, 1887. Serial No. 255,780. (No model.)

*To all whom it may concern:*

Be it known that I, JAMES S. HENDRICKSON, a citizen of the United States, resident of Olmsted, county of Cuyahoga, and State of Ohio, have invented certain new and useful Improvements in Harnesses, of which the following is a specification, the principle of the invention being herein explained and the best mode in which I have contemplated applying that principle so as to distinguish it from other inventions.

The object of my invention is the production of an improved form of harness which shall do away with the incumbrance of breeching and holdbacks, heretofore in use, and also with the girth connecting the two thill-straps, and substituting therefor a light and economical holdback, to the successful use of which no thill-strap, girth, or breeching is required.

Referring to the drawings, Figure 1 is a plan view of my improved harness as seen in position on a horse. Fig. 2 is a side elevation of the same, part of the thill being broken away. Fig. 3 is a transverse vertical section of the pad, taken on the dotted line of Fig. 4. Fig. 4 is a plan view of the same, certain parts being broken away. Fig. 5 is a detail side elevation of a portion of the thill, showing the manner of connecting the holdback-strap to the same.

A is the saddle, having attached to it the thill-straps $a$ on either side.

C is the back-strap, and $c$ the crupper-strap. The pad $e$ is provided with small pieces of leather $d$ for the crupper to rest on, all being sewed firmly together.

Between the pieces $d$ is an opening, $d'$, through which the strap F is allowed to slide. Holdback-strap F is divided into portions $f f'$, the first passing down the left side and the latter down the right side of the horse, thence under its belly, and is secured to the opposite side of the horse from which it passes. The thills B B' have secured to them the rings $g$, while the two ends of the holdback are provided with snap-hooks $h$, which respectively snap into said rings, and thus connect the holdback with the thills. The hook $h$, connected with the strap $f'$, passing down the left side of the horse, thence under the animal, is hooked in the ring $g$, attached to the right thill, B'. The strap $f$, passing down the right side of the horse, thence under the animal, crossing the strap $f'$, as seen by the dotted lines in Fig. 1, is attached to the left thill, B, in the manner shown in Fig. 5.

It will be noticed that I am also, by means of this device, enabled to do away with the usual girth connecting the two thill-straps, as by passing the two portions of the holdback under the horse and securing them to the opposite thill I effectually steady the thills and prevent any upward movement of the same.

It will be understood that although I have described my improvement as applied to a single harness, I may as easily and readily apply the improvement to a double harness by merely attaching the two ends of the holdback to a common ring, that is attached to a strap connecting with the yoke, and thus do away with any breeching.

The foregoing description and accompanying drawings set forth in detail mechanism in embodiment of my invention. Change may, therefore, be made therein, provided the principles of construction respectively recited in the following claims are retained and employed.

I therefore particularly point out and distinctly claim as my invention—

1. In a harness, the combination, with a crupper and pad secured thereto, of a holdback loosely passing between the two, extending down on either side of the horse, crossing under the same, and adapted to be attached to the thills, substantially as set forth.

2. The combination of crupper $c$, pad $e$, an opening formed intermediate of the two, and holdback F, fitted loosely in said opening and adapted to encircle the horse and be attached to the thills, substantially as set forth.

In testimony that I claim the foregoing to be my invention I have hereunto set my hand this 19th day of November, A. D. 1887.

JAMES S. HENDRICKSON.

Witnesses:
J. B. FAY,
C. B. NASH.